United States Patent
Kariatsumari

(10) Patent No.: US 8,129,935 B2
(45) Date of Patent: Mar. 6, 2012

(54) MOTOR CONTROL DEVICE

(75) Inventor: Yuji Kariatsumari, Yamatotakada (JP)

(73) Assignee: JTEKT Corporation, Osaka (JP)

( * ) Notice: Subject to any disclaimer, the term of this patent is extended or adjusted under 35 U.S.C. 154(b) by 631 days.

(21) Appl. No.: 12/292,812

(22) Filed: Nov. 26, 2008

(65) Prior Publication Data

US 2009/0134834 A1    May 28, 2009

(30) Foreign Application Priority Data

Nov. 28, 2007   (JP) ................. 2007-307644

(51) Int. Cl.
*H02P 23/00*    (2006.01)
*H02P 25/00*    (2006.01)
*H02P 27/00*    (2006.01)

(52) U.S. Cl. ........ 318/799; 318/809; 318/432; 318/433; 318/434

(58) Field of Classification Search .................. 318/799, 318/809, 432–434
See application file for complete search history.

(56) References Cited

U.S. PATENT DOCUMENTS

| 5,841,263 | A | 11/1998 | Kaneko et al. |
| 6,008,617 | A | 12/1999 | Kaneko et al. |
| 6,037,742 | A | 3/2000 | Rasmussen |
| 6,972,534 | B1 | 12/2005 | Schulz et al. |
| 2001/0005121 | A1 | 6/2001 | Sakamaki |
| 2007/0055425 | A1 | 3/2007 | Oya et al. |

FOREIGN PATENT DOCUMENTS

| EP | 0751613 A1 | 1/1997 |
| JP | 6-335277 A | 12/1994 |

*Primary Examiner* — Walter Benson
*Assistant Examiner* — Erick Glass
(74) *Attorney, Agent, or Firm* — Rabin & Berdo, P.C.

(57) ABSTRACT

A motor control device includes: a motor-current detection unit; a rotational-angular-speed calculation unit for calculating a rotational angular speed of a motor; a rotational-angle-change-amount calculation unit for multiplying the rotational angular speed by a predetermined time so as to calculate a motor-rotational-angle change amount within a predetermined time; a basic-drive-value calculation unit for calculating a basic drive value for driving the motor; a correction-value calculation unit for calculating a correction value for correcting the basic drive value based on the motor current and the motor-rotational-angle change amount; a correction unit for evaluating the motor drive value by correcting the basic drive value by the correction value; and a drive unit for driving the motor by using the motor drive value evaluated by the correction unit.

11 Claims, 5 Drawing Sheets

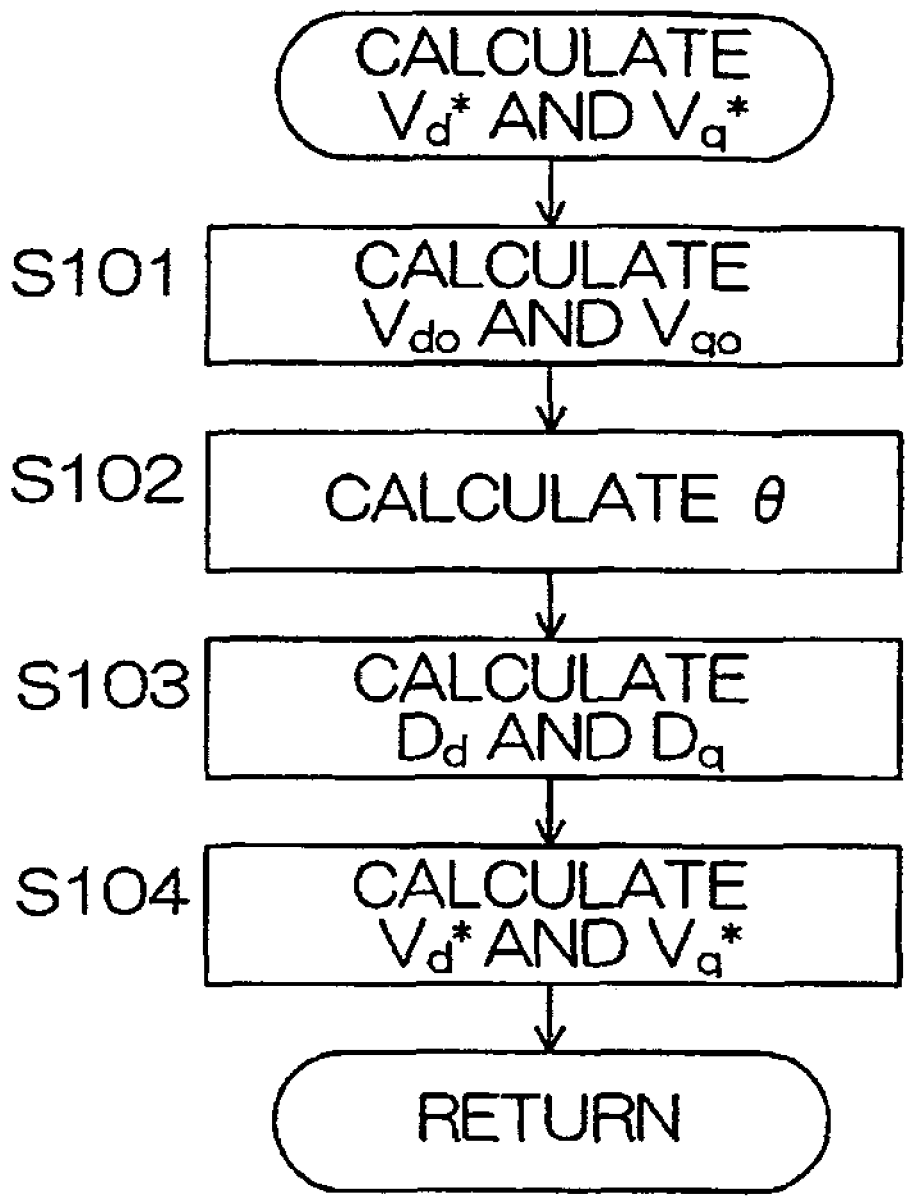

MOTOR CONTROL DEVICE

BACKGROUND OF THE INVENTION

1. Field of the Invention

The present invention relates to a motor control device for driving a motor (particularly, a brushless motor). The brushless motor is utilized as a generation source of steering assist force in an electric power steering apparatus, for example.

2. Description of Related Art

A motor control device for a brushless motor is provided with: a current detection portion; a rotational position detection portion; a dq-axis target-current calculation portion; a dq-axis current calculation portion; a d-axis voltage command value calculation portion; and a q-axis voltage command value calculation portion. The current detection portion detects a current flowing through an armature winding of a motor. The rotational position detection portion detects a rotor rotational position of the motor. The dq-axis target-current calculation portion calculates a d-axis target current and a q-axis target current. The dq-axis current calculation portion evaluates a d-axis current and a q-axis current based on the detected armature winding current and rotor rotational position. The d-axis voltage command value calculation portion evaluates a d-axis voltage command value based on a PI calculation of a d-axis deviation so that the d-axis deviation between the d-axis target current and the d-axis current is decreased. The q-axis voltage command value calculation portion evaluates a q-axis voltage command value based on a PI calculation of the q-axis deviation so that the q-axis deviation between the q-axis target current and the q-axis current is decreased. Based on the d-axis voltage command value thus evaluated, the q-axis voltage command value thus evaluated and the detected rotor rotational position, the motor control device applies voltage to the armature winding. Thereby, the rotation force of the rotor is generated.

On the other hand, there is known a non-interacting control in which a non-interacting control amount is added to a PI calculation value (see US 2001/0005121A1). The non-interacting control is a control which defines a voltage command value so that compensation is made for a speed electromotive force generated inside a motor along with the rotation of the rotor. It is expected that when the non-interacting control is performed, a decrease in responsiveness and tracking resulting from the speed electromotive force can be effectively inhibited.

SUMMARY OF THE INVENTION

Speed electromotive force generated inside a motor depends on a rotational angular speed and a current. Therefore, a non-interacting control amount to compensate for the force also depends similarly on the rotational angular speed and the current. More specifically, a d-axis non-interacting control amount depends on the rotational angular speed and a q-axis current, and a q-axis non-interacting control amount depends on the rotational angular speed and a d-axis current.

However, from when currents of armature windings of each phase of the motor are detected until these currents are converted into the d-axis current and the q-axis current and further a d-axis voltage command value and a q-axis voltage command value are output, a calculation time for a coordinate conversion, a PI calculation, etc., is needed. Even during this time, the rotor is rotated, and thus, along with the rotation, the d-axis and the q-axis are rotated. As a result, by the time that the d-axis voltage command value and the q-axis voltage command value are output, directions of a d-axis and a q-axis are deviated from directions of the d-axis and the q-axis at the time of the motor current detection. Therefore, the d-axis current and the q-axis current used for the calculation of the non-interacting control amount are deviated from an appropriate value. Thus, the non-interacting control does not necessarily generate the expected effect, and also the motor current becomes variable, which may bring about vibration or abnormal noise.

Also in correction control other than the non-interacting control, if the motor drive value is corrected in d-q coordinates system of rotational coordinate system, a similar problem arises.

Therefore, an object of the present invention is to provide a motor control device capable of controlling a motor more appropriately by compensating for an influence of rotation during a calculation time.

The motor control device of the present invention includes: a motor-current detection unit for detecting a motor current flowing through a motor; a rotational-angular-speed calculation unit for calculating a rotational angular speed of the motor; a rotational-angle-change-amount calculation unit for multiplying the rotational angular speed calculated by the rotational-angular-speed calculation unit by a predetermined time so as to calculate a motor-rotational-angle change amount within the predetermined time; a basic-drive-value calculation unit for calculating a basic drive value for driving the motor; a correction-value calculation unit for calculating a correction value for correcting the basic drive value based on the motor current detected by the motor-current detection unit and the motor-rotational-angle change amount calculated by the rotational-angle-change-amount calculation unit; a correction unit for correcting the basic drive value calculated by the basic-drive-value calculation unit by the correction value calculated by the correction-value calculation unit so as to obtain the motor drive value; and a drive unit for driving the motor by using the motor drive value obtained by the correction unit.

According to this configuration, the correction value for correcting the basic drive value can be obtained by using not only the motor current but also the motor-rotational-angle change amount within a predetermined time. Therefore, the correction value can be a value added by a change in motor current corresponding to the motor-rotational-angle change amount within the predetermined time. Thereby, motor control can be performed while an influence of the rotation during a calculation time is inhibited.

The motor-current detection unit may include: a phase-current detection unit for detecting a phase current flowing through an armature winding of the motor; and a coordinate conversion unit for converting the phase current detected by the phase-current detection unit into a current value of a rotational coordinate system (for example, a dq-coordinate system), based on a rotor rotational position. In this case, the coordinate conversion unit may perform a coordinate conversion process based on output of a rotational-position detection unit for detecting a rotor rotational position.

The correction-value calculation unit may calculate a correction value for non-interacting control of the motor. According to this configuration, non-interacting control in which compensation is made for a delay of a calculation time can be performed, and thus, responsiveness and tracking of the motor can be effectively improved. Further, the motor can be driven by the appropriate motor drive value corresponding to the motor current, and thus, it becomes possible to inhibit the motor current from becoming variable, resulting in inhibiting vibrations and abnormal noise.

The basic-drive-value calculation unit may be for calculating a d-axis drive voltage and a q-axis drive voltage. In this case, the correction-value calculation unit preferably calculates a d-axis correction value $D_d$ for correcting the d-axis drive voltage according to the following formula A1 and for calculating a q-axis correction value $D_q$ for correcting the q-axis drive voltage according to the following formula B1:

$$D_d = -\omega L_q(-I_d \sin\theta + I_q \cos\theta) \quad\quad A1$$

$$D_q = \omega L_d(I_d \cos\theta + I_q \sin\theta) + \omega\Phi \quad\quad B1,$$

where $\omega$ denotes a rotational angular speed (rad/second) of a motor, $L_d$ denotes a d-axis inductance (H), $L_q$ denotes a q-axis inductance (H), $I_d$ denotes ad-axis current (A), $I_q$ denotes a q-axis current (A), $\theta$ denotes a motor-rotational-angle change amount (rad), and $\Phi$ denotes a factor of $(3/2)^{1/2}$ of a maximum value of a magnetic flux linkage of an armature winding in a field system of a motor, respectively.

According to this configuration, a d-axis non-interacting control amount and a q-axis non-interacting control amount in which a motor-rotational-angle change amount $\theta$ within a predetermined time is taken into consideration are evaluated as a d-axis correction value $D_d$ and a q-axis correction value $D_q$, respectively. As a result, non-interacting control in which compensation is made for a delay of a calculation time can be performed.

Further, the correction-value calculation unit may be for calculating a d-axis correction value $D_d$ for correcting the d-axis drive voltage according to the following formula A2 and for calculating a q-axis correction value $D_q$ for correcting the q-axis drive voltage according to the following formula B2:

$$D_d = -\omega L_q \cdot I_q \cos\theta \quad\quad A2$$

$$D_q = \omega L_d \cdot I_d \cos\theta + \omega\Phi \quad\quad B2$$

When the predetermined time is defined as a minute time corresponding to the calculation time, the rotational-angle change amount $\theta$ also is a minute value. Thus, in the aforementioned formulae A1 and B1, the term of $\sin\theta$ is minute, and hence, this term can be ignored. Therefore, when the d-axis correction value $D_d$ and the q-axis correction value $D_q$ are defined according to the aforementioned formulae A2 and B2, the calculation process is simplified, and at the same time, effective non-interacting control can be realized.

The motor control device may update the motor drive value for each predetermined calculation cycle so as to output the updated value. Further, the motor-current detection unit may detect a motor current at a predetermined timing during the calculation cycle. In this case, in a period from when the motor drive value is updated in a certain calculation cycle until the motor drive value is updated in a subsequent calculation cycle, the motor drive value is held at a constant value. Therefore, it is preferable that the predetermined time be equal to or more than a time from a detection timing at which the motor current is detected by the motor-current detection unit during a certain calculation cycle until the motor drive value is updated during the calculation cycle, the predetermined time being defined as a length equal to or less than a time from the detection timing during the calculation cycle until the motor drive value is updated during a subsequent calculation cycle. Therefore, the motor drive value is a value in which compensation is made for an-influence of the rotational-angle change amount from when the motor current corresponding to the motor drive value is detected. In this way, the influence of the rotational-angle change amount can be effectively compensated.

The predetermined time may be defined as equal to the calculation cycle. Thereby, an influence of a delay of a calculation time can be effectively compensated. As long as the motor current is detected at a constant timing during each calculation cycle, the calculation cycle eventually becomes equal to a motor-current detection cycle.

These and other objects, features and effects of the present invention will be more apparent from the following embodiments described with reference to the accompanying drawings.

BRIEF DESCRIPTION OF THE DRAWINGS

FIG. 6 is a flow chart showing a calculation procedure of a d-axis voltage command value and a q-axis voltage command value.

DETAILED DESCRIPTION OF PREFERRED EMBODIMENTS

Figure 1:
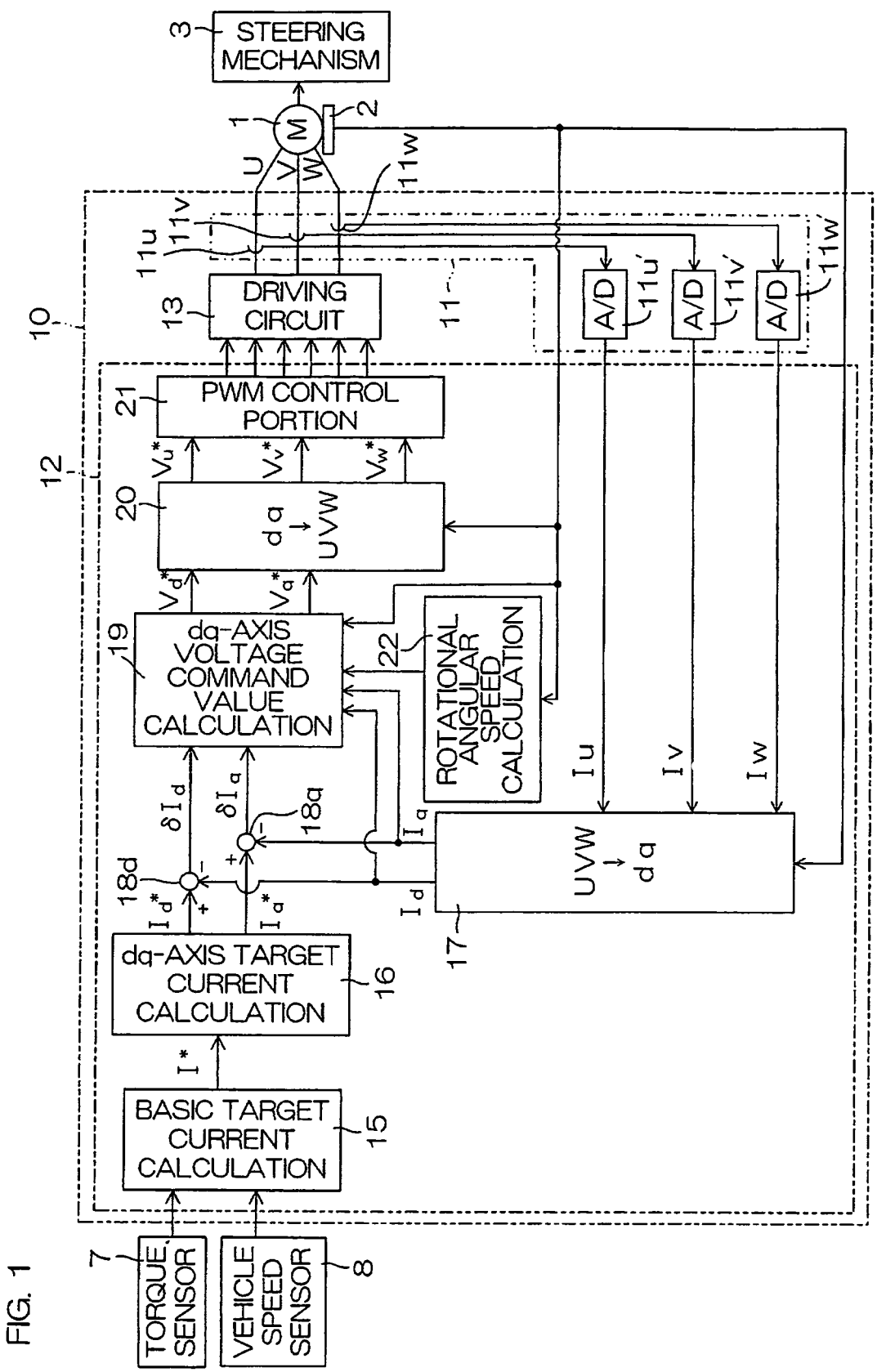
FIG. 1 is a block diagram for describing an electric configuration of an electric power steering apparatus to which a motor control device according to one embodiment of the present invention is applied.

FIG. 1 is a block diagram for describing an electric configuration of an electric power steering apparatus to which a motor control device according to one embodiment of the present invention is applied. The electric power steering apparatus is provided with a torque sensor 7, a vehicle speed sensor 8, a motor 1, and a motor control device 10. The torque sensor 7 detects a steering torque applied to steering wheels of a vehicle. The vehicle speed sensor 8 detects a speed of the vehicle. The motor 1 applies steering assist force to the steering mechanism 3 of the vehicle. The motor control device 10 controls driving of the motor 1. The motor control device 10 drives the motor 1 according to a steering torque detected by the torque sensor 7 and a vehicle speed detected by the vehicle speed sensor 8 thereby to realize the appropriate steering assist according to a steering situation. The motor 1 is a three-phase brushless DC motor, for example.

The motor control device 10 includes a current detection portion 11 (phase-current detection unit), a microcomputer 12 as a signal processing portion, and a driving circuit 13. The motor control device 10 is connected with, together with a resolver 2 (rotational position sensor) for detecting a rotation position of a rotor within the motor 1, the aforementioned torque sensor 7 and vehicle speed sensor 8.

The current detection portion 11 detects currents flowing through armature windings of the motor 1. More specifically, the current detection portion 11 includes a current detectors 11u, 11v, and 11w, and A/D converters 11u', 11v', and 11w'. The current detectors 11u, 11v, and 11w detect phase currents in the armature windings of three phases (U phase, V phase, and W phase), respectively. The A/D converters 11u', 11v', and 11w' A/D (analog/digital)-convert current detection signals by the current detectors 11u, 11v, and 11w.

The microcomputer 12 is provided with a plurality of function processing portions realized by a program process (software process). The plurality of function processing portions includes; a basic-target-current calculation portion 15; a dq-axis target-current calculation portion 16; dq-axis current calculation portion 17 (coordinate conversion unit); a d-axis deviation calculation portion 18d; a q-axis deviation calculation portion 18q; a dq-axis voltage-command-value calculation portion 19; a voltage-command-value-coordinate conversion portion 20; a PWM (pulse width modulation) control portion 21; and a rotational-angular-speed calculation portion 22 (rotational-angular-speed calculation unit). The voltage-command-value-coordinate conversion portion 20, the PWM control portion 21, and the driving circuit 13 configure a drive unit for driving the motor 1.

The driving circuit 13 is configured by an inverter circuit, and when being controlled by the PWM control portion 21, the driving circuit 13 supplies the armature windings of the U phase of the motor 1, the V phase thereof, and the W phase thereof, with electric power from a power supply such as a vehicle-mounted battery. The phase currents flowing between the driving circuit 13 and the armature windings of each phase of the motor 1 are to be detected by the current detectors 11u, 11v, and 11w.

The basic-target-current calculation portion 15 calculates a basic target current I* of the motor 1 based on the steering torque sensed by the torque sensor 7 and the vehicle speed detected by the vehicle speed sensor 8. The basic target current I* is defined so that it becomes larger as the steering torque is larger and becomes larger as the vehicle speed is smaller, for example.

The basic target current I* calculated by the basic-target-current calculation portion 15 is input to the dq-axis target-current calculation portion 16. The dq-axis target-current calculation portion 16 calculates a d-axis target current $I_d^*$ for generating a magnetic field in a d-axis direction and a q-axis target current $I_q^*$ for generating a magnetic field in a q-axis direction. A d-axis is an axis along a magnetic-flux direction of a field system provided in the rotor of the motor 1, and a q-axis is an axis perpendicular to the d-axis and a rotor rotational axis. The calculation in the dq-axis target-current calculation portion 16 can be performed by using a well-known calculation formula.

The phase currents Iu, Iv, and Iw output from the current detection portion 11 are input to the dq-axis current calculation portion 17. The dq-axis current calculation portion 17 performs a coordinate conversion of the phase currents Iu, Iv, and Iw based on the rotor rotational position detected by the resolver 2 so as to calculate the d-axis current $I_d$ and the q-axis current $I_q$. The calculation in the dq-axis current calculation portion 17 can be performed by using a well-known calculation formula.

The d-axis deviation calculation portion 18d evaluates a d-axis deviation $\delta I_d$ between the d-axis target current $I_d^*$ and the d-axis current $I_d$. Likewise, the q-axis deviation calculation portion 18q evaluates a q-axis deviation $\delta I_q$ between the q-axis target current $I_q^*$ and the q-axis current $I_q$.

The dq-axis voltage-command-value calculation portion 19 evaluates a d-axis voltage command value $V_d^*$ corresponding to the d-axis deviation $\delta I_d$ and a q-axis voltage command value $V_q^*$ corresponding to the q-axis deviation $\delta I_q$.

The voltage-command-value-coordinate conversion portion 20 performs a coordinate conversion of the d-axis voltage command value $V_d^*$ and the q-axis voltage command value $V_q^*$ based on the rotor rotational position detected by the resolver 2 so as to calculate applied-voltage command values Vu*, Vv*, and Vw* to be applied to the U-phase armature winding, the V-phase armature winding, and the W-phase armature winding, respectively. The calculation in the voltage-command-value-coordinate conversion portion 20 may be performed by using a well-known calculation formula.

The PWM control portion 21 generates PWM control signals of the respective phases, which are pulse signals having a duty ratio corresponding to each of the applied-voltage command values Vu*, Vv*, and Vw*. Thereby, voltages corresponding to the d-axis voltage command value $V_d^*$ and the q-axis voltage command value $V_q^*$ are applied from the driving circuit 13 to the armature winding of each phase, thereby generating rotational force of the rotor.

The rotational-angular-speed calculation portion 22 calculates a time change (differentiation) of the rotor rotational position detected by the resolver 2 so as to evaluate a rotational angular speed ω (rad/sec). The rotational angular speed ω is to be input to the dq-axis voltage-command-value calculation portion 19.

Figure 2:
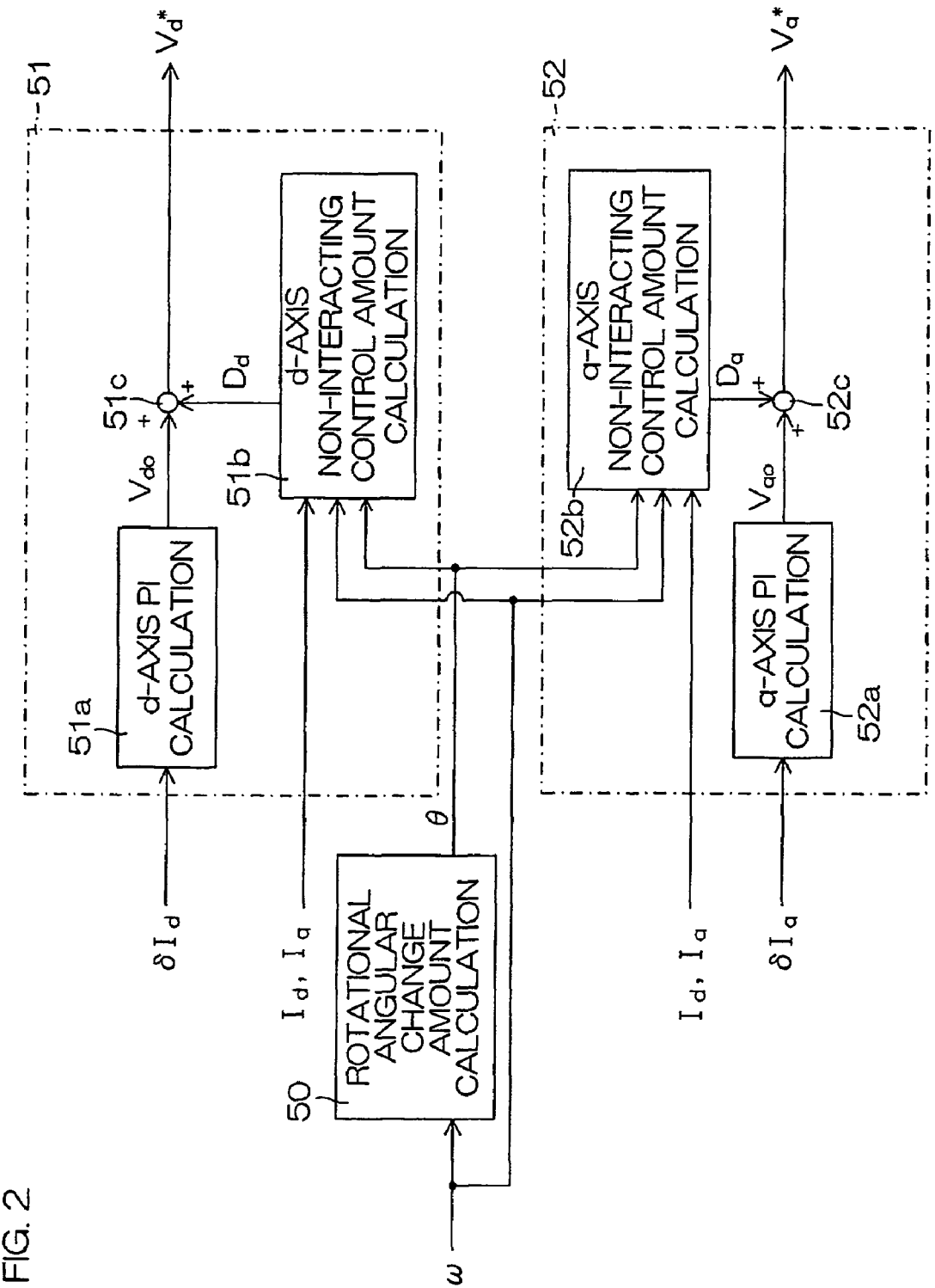
FIG. 2 is a block diagram for describing a detailed configuration of a dq-axis voltage-command-value calculation portion.

FIG. 2 is a block diagram for describing a detailed configuration of the dq-axis voltage-command-value calculation portion 19. The dq-axis voltage-command-value calculation portion 19 includes a rotational-angle change-amount calculation portion 50 (rotational-angle-change-amount calculation unit), a d-axis voltage-command-value calculation portion 51, and a q-axis voltage-command-value calculation portion 52. The d-axis voltage-command-value calculation portion 51 evaluates the d-axis voltage command value $V_d^*$ based on a PI calculation of the d-axis current (hereinafter, called "d-axis PI calculation"), etc., so that the d-axis deviation $\delta I_d$ is decreased. The q-axis voltage-command-value calculation portion 52 evaluates the q-axis voltage command value $V_q^*$ based on a PI calculation of the q-axis current (hereinafter, called "q-axis PI calculation"), etc., so that the q-axis deviation $\delta I_q$ is decreased.

The rotational-angle change-amount calculation portion 50 multiplies the rotational angular speed ω calculated by the rotational-angular-speed calculation portion 22 by a predetermined time T so as to evaluate a change amount θ (hereinafter, called "rotational-angle change amount θ") of the rotor rotational angle in the predetermined time T.

The d-axis voltage-command-value calculation portion 51 includes a d-axis PI calculation portion 51a (basic-drive-value calculation unit), a d-axis non-interacting-control-amount calculation portion 51b (correction-value calculation unit), and a d-axis addition portion 51c (correction unit).

The d-axis PI calculation portion 51a calculates a d-axis PI calculation value $V_{do}$ by the PI calculation of the d-axis deviation $\delta I_d$, and outputs the d-axis PI calculation value $V_{do}$ to the d-axis addition portion 51c.

The d-axis non-interacting-control-amount calculation portion 51b evaluates a d-axis non-interacting control amount $D_d$ based on: the d-axis current $I_d$ and the q-axis current $I_q$ evaluated by the dq-axis current calculation portion 17; the rotational angular speed ω (rad/sec) evaluated by the rotational-angular-speed calculation portion 22; and the rotational-angle change amount θ evaluated by the rotational-angle change-amount calculation portion 50.

The d-axis addition portion 51c adds the d-axis non-interacting control amount $D_d$ to the d-axis PI calculation value $V_{do}$. The addition result is the d-axis voltage command value $V_d^*(=V_{do}+D_d)$. Therefore, the d-axis PI calculation value $V_{do}$ is corrected by the d-axis non-interacting control amount $D_d$ so as to evaluate the d-axis voltage command value $V_d^*$.

The q-axis voltage-command-value calculation portion 52 includes a q-axis PI calculation portion 52a (basic-drive-value calculation unit), a q-axis non-interacting-controlamount calculation portion 52b (correction-value calculation unit), and a q-axis addition portion 52c (correction unit).

The q-axis PI calculation portion 52a calculates a q-axis PI calculation value $V_{qo}$ by the PI calculation of the q-axis deviation $\delta I_q$, and outputs the q-axis PI calculation value $V_{qo}$ to the q-axis addition portion 52c.

The q-axis non-interacting-control-amount calculation portion 52b evaluates a q-axis non-interacting control amount $D_q$ based on: the d-axis current $I_d$ and the q-axis current $I_q$ evaluated by the dq-axis current calculation portion 17; the rotational angular speed ω (rad/sec) evaluated by the rotational-angular-speed calculation portion 22; and the rotational-angle change amount θ evaluated by the rotational-angle change-amount calculation portion 50.

The q-axis addition portion 52c adds the q-axis non-interacting control amount $D_q$ to the q-axis PI calculation value $V_{qo}$. The addition result is the q-axis voltage command value $V_q{}^*(=V_{qo}+D_q)$. Therefore, the q-axis PI calculation value $V_{qo}$ is corrected by the q-axis non-interacting control amount $D_q$ so as to evaluate the q-axis voltage command value $V_q{}^*$.

Figure 3:
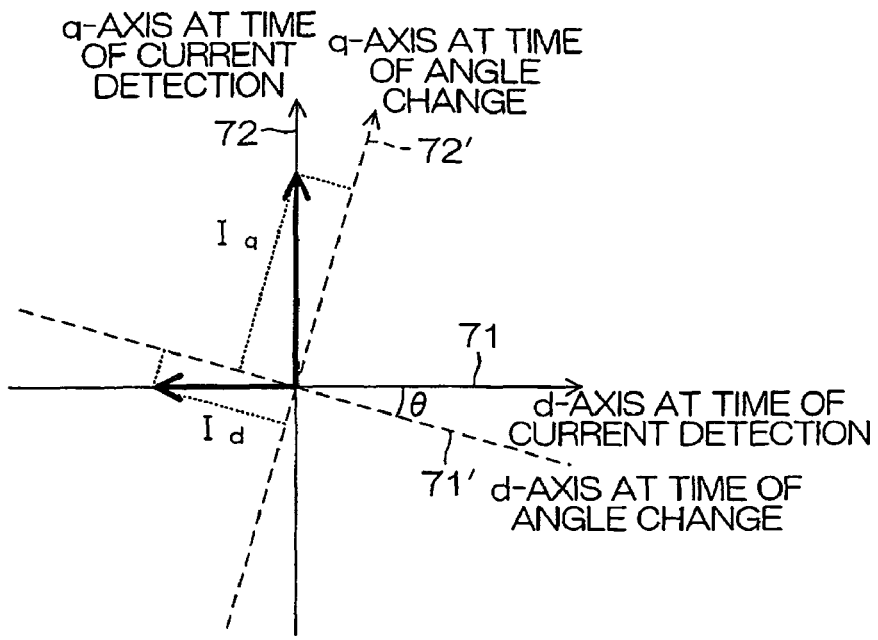
FIG. 3 is a diagram for describing a calculation of a d-axis non-interacting control amount and a q-axis non-interacting control amount.

FIG. 3 is a diagram for describing a calculation of the d-axis non-interacting control amount $D_d$ and the q-axis non-interacting control amount $D_q$ by the d-axis non-interacting-control-amount calculation portion 51b and the q-axis non-interacting-control-amount calculation portion 52b. The speed electromotive force generated internally in the motor 1 is expressed by $\omega L_q I_q$ with respect to the d axis and by $-(\omega L_d I_d+\omega\Phi)$ with respect to the q axis. Therefore, the d-axis non-interacting control amount $D_d$ that compensates for these values is expressed by $-\omega L_q I_q$ and the q-axis non-interacting control amount $D_q$ is expressed by $\omega L_d I_d+\omega\Phi$.

On the other hand, from when the current is detected by the current detection portion 11 until the d-axis voltage command value $V_d{}^*$ and the q-axis voltage command value $V_q{}^*$, which are drive values corresponding to the detected current, are output, a calculation time for a coordinate conversion, a PI calculation, etc., is needed. More specifically, the microcomputer 12 updates the d-axis voltage command value $V_d{}^*$ and the q-axis voltage command value $V_q{}^*$ for each predetermined calculation cycle (for example, 0.0005 seconds) and outputs the updated values. Therefore, from when the current is detected by the current detection portion 11 until the d-axis voltage command value $V_d{}^*$ and the q-axis voltage command value $V_q{}^*$ are updated to the values corresponding to the detected current, a delayed time is generated. Even during the delayed time, the rotor is rotated, and thus, the d axis and the q axis are rotated accordingly thereto. Therefore, by the time that the updated d-axis voltage command value $V_d{}^*$ and q-axis voltage command value $V_q{}^*$ are output, the voltage command values $V_d{}^*$ and $V_q{}^*$ are deviated from an appropriate value only by the delayed time.

As shown in FIG. 3, suppose that a d axis 71 and a q axis 72 are rotated only by a angle change amount θ so that these axes are rotated and moved to a d axis 71' and a q axis 72'. In addition, assume that the angle change amount θ is minute, and a phase current does not change during the rotation. As a result, a d-axis current $I_d{}'$ and a q-axis current $I_q{}'$ after the rotation can be expressed by the following formulae (1) and (2) by using a d-axis current $I_d$ and a q-axis current $I_q$ (detected values) before the rotation.

$$I_d{}'=I_d\cos\theta+I_q\sin\theta \tag{1}$$

$$I_q{}'=-I_d\sin\theta+I_q\cos\theta \tag{2}$$

In this case, the d-axis non-interacting-control-amount calculation portion 51b calculates the d-axis non-interacting control amount $D_d$ according to the following formula (3), and the q-axis non-interacting-control-amount calculation portion 52b calculates the q-axis non-interacting control amount $D_q$ according to the following formula (4). In the formulae, $L_q$ denotes a q-axis self inductance of the armature winding of the motor 1 and $L_d$ denotes a d-axis self inductance of the armature winding of the motor 1, each of which is a constant previously measured. In the formulae, Φ is a factor of $(3/2)^{1/2}$ of a maximum value of a magnetic flux linkage of the armature winding in the field system of the rotor.

$$D_d=-\omega L_q I_q{}'=-\omega L_q(-I_d\sin\theta+I_q\cos\theta) \tag{3}$$

$$D_q=\omega L_d I_d{}'+\omega\Phi=\omega L_d(I_d\cos\theta+I_q\sin\theta)+\omega\Phi \tag{4}$$

Therefore, when the angle change amount θ is evaluated to correspond to the delayed time of the calculation, it becomes possible to evaluate a non-interacting control amount in which the delayed time of calculation is taken into consideration.

Figure 4:
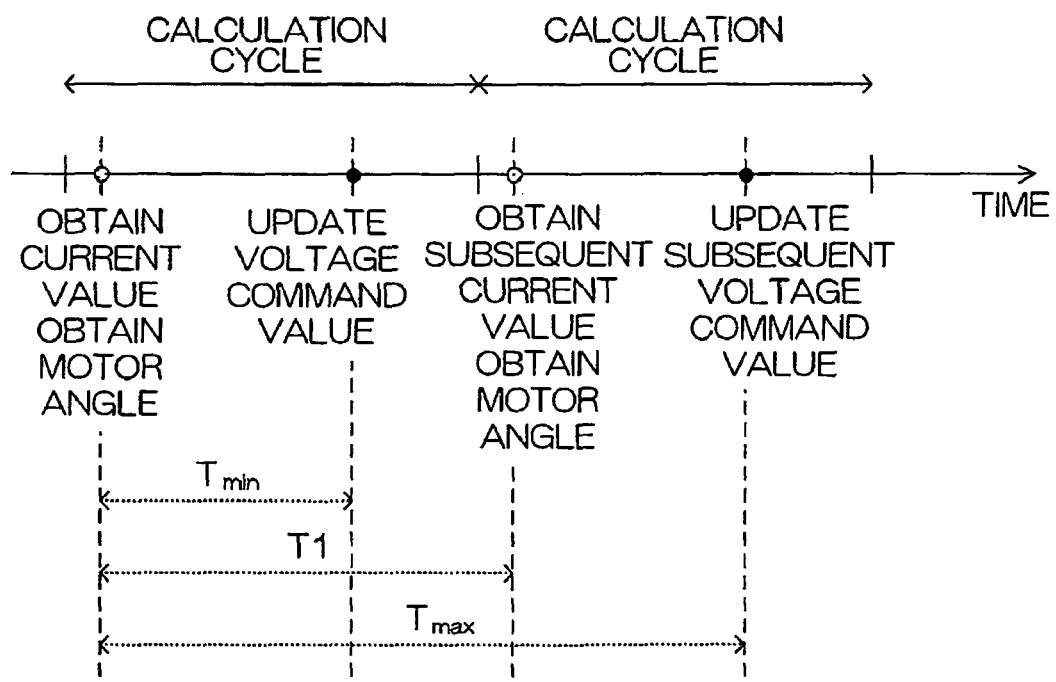
FIG. 4 is a timing chart illustrating each timing of obtaining of a current value and updating of a voltage command value.

FIG. 4 is a timing chart illustrating each timing of obtaining of a current value and updating of a voltage command value. Detected current values are obtained from the A/D converters 11u', 11v', and 11w' at a predetermined initial timing in a calculation cycle, and also the rotor rotational position (motor angle) is obtained from the resolver 2. The voltage command values $V_d{}^*$ and $V_q{}^*$ are updated at a predetermined latter-half timing in the calculation cycle. The voltage command values $V_d{}^*$ and $V_q{}^*$ remain unchanged until these are updated in a subsequent calculation cycle.

Therefore, a lower limit of a predetermined time T multiplying the rotational angular speed ω when the angle change amount θ is calculated may be set to a time Tmin, which is from when the current value and the rotor rotational position are obtained in a certain calculation cycle until the voltage command values $V_d{}^*$ and $V_q{}^*$ are updated in the calculation cycle. An upper limit of the predetermined time T may be set to a time Tmax, which is from when the current value and the rotor rotational position are obtained in a certain calculation cycle until the voltage command values $V_d{}^*$ and $V_q{}^*$ are updated in a subsequent calculation cycle. That is, the predetermined time T may be defined between the times Tmin and Tmax.

For example, the predetermined time T may be set to a time Tmin (for example, 100 μsec to 200 μsec), which is from when the current value and the rotor rotational position are obtained in a certain calculation cycle until the voltage command values $V_d{}^*$ and $V_q{}^*$ are updated in the calculation cycle. The predetermined time T may also be set to a time T1 (current detection cycle), which is from when the current value and the rotor rotational position are obtained in a certain calculation cycle until the current value is obtained in a subsequent calculation cycle. The time T1 is substantially equal to the calculation cycle. The predetermined time T may be set to a time Tmax, which is from when the current value and the rotor rotational position are obtained in a certain calculation cycle until the voltage command values $V_d{}^*$ and $V_q{}^*$ are updated in a subsequent calculation cycle.

When the non-interacting control amount corresponding to a timing substantially in the middle of an unupdated period of the voltage command values $V_d{}^*$ and $V_q{}^*$ is calculated, the detected current value and rotor rotational position are best matched with the voltage command values $V_d{}^*$ and $V_q{}^*$. Therefore, the predetermined time T is preferably defined for the aforementioned time T1.

Figure 5:
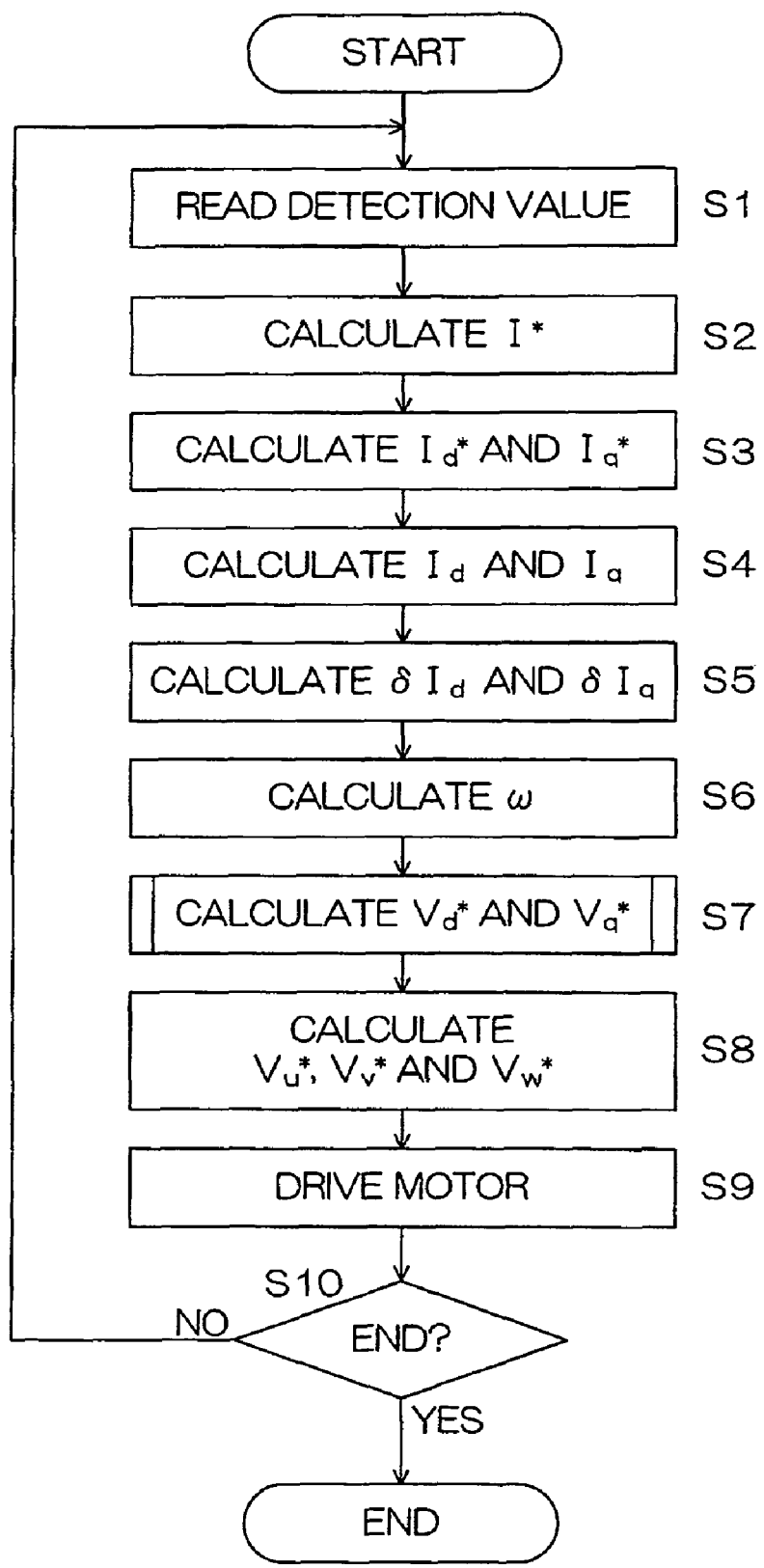
FIG. 5 is a flow chart for describing a control procedure of a motor by a motor control device.

FIG. 5 is a flow chart for describing a control procedure of the motor 1 by the motor control device 10. At first, the microcomputer 12 reads detected values by the torque sensor 7, the vehicle speed sensor 8, the current detectors 11u, 11v, and 11w, and the resolver 2 (step S1). The basic-target-current calculation portion 15 calculates the target current I* based on the detected steering torque and vehicle speed (step S2). The dq-axis target-current calculation portion 16 calculates the d-axis target current $I_d$* and the q-axis target current $I_q$* corresponding to the target current I* (step S3). The dq-axis current calculation portion 17 calculates the d-axis current $I_d$ and the q-axis current $I_q$ corresponding to the detected phase currents Iu, Iv, and Iw (step S4). From the d-axis target current $I_d$* and the d-axis current $I_d$, the d-axis deviation $\delta I_d$ is calculated in the d-axis deviation calculation portion 18d, and from the q-axis target current $I_q$* and the q-axis current $I_q$, the q-axis deviation $\delta I_q$ is calculated in the q-axis deviation calculation portion 18q (step S5). The rotational-angular-speed calculation portion 22 calculates the rotational angular speed ω based on the rotor rotational position detected by the resolver 2 (step S6).

Subsequently, in the dq-axis voltage-command-value calculation portion 19, the d-axis voltage command value $V_d$* and the q-axis voltage command value $V_q$* are calculated (step S7). In the voltage-command-value-coordinate conversion portion 20, the applied voltage command values Vu*, Vv*, and Vw* to the U-phase armature winding, the V-phase armature winding, and the W-phase armature winding corresponding to the d-axis voltage command value $V_d$* and the q-axis voltage command value $V_q$* are calculated (step S8). The PWM control signal corresponding to the applied voltage command values Vu*, Vv*, and Vw* are applied from the PWM control portion 21 to the driving circuit 13. Thereby, the motor 1 is driven (step S9). Whether or not to end the control is determined by ON/OFF of an ignition switch, for example (step S10), and when the control is not ended, the process returns to step S1.

FIG. 6 is a flow chart showing a calculation procedure of the d-axis voltage command value $V_d$* and the q-axis voltage command value $V_q$*. At first, from the d-axis PI calculation and the q-axis PI calculation, the d-axis PI calculation value $V_{do}$ and the q-axis PI calculation value $V_{qo}$ are evaluated, respectively (step S101). On the other hand, in the rotational-angle change-amount calculation portion 50, the rotational angular speed ω is multiplied by the predetermined time T so that the rotational-angle change amount θ is evaluated (step S102). The rotational-angle change amount θ is used to evaluate the d-axis non-interacting control amount $D_d$ in the d-axis non-interacting-control-amount calculation portion 51b and the q-axis non-interacting control amount $D_q$ in the q-axis non-interacting-control-amount calculation portion 52b (step S103). Thereafter, the d-axis non-interacting control amount $D_d$ is added to the d-axis PI calculation value $V_{do}$ so that the d-axis voltage command value $V_d$* is evaluated, and the q-axis non-interacting control amount $D_q$ is added to the q-axis PI calculation value $V_{qo}$ so that the q-axis voltage command value $V_q$* is evaluated (step S104). The d-axis voltage command value $V_d$* and the q-axis voltage command value $V_q$* thus evaluated are output.

Thus, according to the embodiment, the non-interacting control amounts $D_d$ and $D_q$ that are corrected so as to match the update timings of the voltage command values $V_d$* and $V_q$* are evaluated, and by the non-interacting control amounts $D_d$ and $D_q$, the PI calculation values $V_{do}$ and $V_{qo}$ are corrected, thereby evaluating the voltage command values $V_d$* and $V_q$*. Therefore, the non-interacting control amounts $D_d$ and $D_q$ can be set to the appropriate values, and thus, it becomes possible to improve responsiveness and tracking while inhibiting or preventing the motor current from being variable. As a result, the dynamic characteristic can be improved while inhibiting vibration and abnormal noise, and thus, a steering feeling in the electric power steering apparatus can be improved.

Thus, one embodiment of the present invention is described, and the present invention can be further embodied in another mode. For example, the angle change amount θ is a minute value, and thus, sin θ is also a minute value. Therefore, instead of the aforementioned formulae (3) and (4), the non-interacting control amounts $D_d$ and $D_q$ may be evaluated according to the following formulae (5) and (6). Thereby, the calculations can be simplified, and thus, a load of the microcomputer 12 can be alleviated.

$$D_d = -\omega L_q \cdot I_q \cos\theta \qquad (5)$$

$$D_q = \omega L_d \cdot I_d \cos\theta + \omega\Phi \qquad (6)$$

In the aforementioned embodiment, the rotor rotational position is detected by the resolver 2. However, the rotor rotational position may be estimated by so-called sensorless control. Based on the estimated rotor rotational position, the rotational angular speed ω may be calculated.

When a difference between $L_d$ and $L_q$ is small such as in an SPM (Surface Permanent Magnet) motor, the non-interacting control amount, etc., may-be calculated, regarding that $L_d = L_q$ is established.

Further, in the aforementioned embodiment, an example in which the PI calculation value is corrected by the non-interacting control amount is described. However, the present invention can be applied to motor control in which a basic drive value for driving a motor is corrected by a correction value that depends upon a rotor rotational position so as to define a motor drive value. For a correction value for such motor control, besides a non-interacting control amount, flux weakening control may be included.

In the aforementioned embodiment, an example in which the present invention is applied to a motor which is a drive source of the electric power steering apparatus is described. However, the present invention can be applied to control of a motor which is intended for use other than that of the electric power steering apparatus. In particular, the present invention is effective when being put into practical use in motor torque control in a use that requires responsiveness or tracking in a servo system.

Although the embodiments of the present invention are described in detail, these embodiments are merely specific examples used for clarifying the technical contents of the present invention. Therefore, the present invention should not be construed as being limited in any way to these specific examples. The spirit and scope of the present invention are limited only by the scope of the appended claims.

This application corresponds to Japanese Patent Application No. 2007-307644 filed with the Japanese Patent Office on Nov. 28, 2007, the entire disclosure of which is incorporated herein by reference.

What is claimed is:

1. A motor control device, comprising:
   a motor-current detection unit configured to detect a motor current flowing through a motor;
   a rotational-angular-speed calculation unit configured to calculate a rotational angular speed of the motor;
   a rotational-angle-change-amount calculation unit configured to multiply the rotational angular speed calculated by the rotational-angular-speed calculation unit by a predetermined time so as to calculate the motor-rotational-angle change amount within the predetermined time;

11 a basic-drive-value calculation unit configured to calculate a basic drive value for driving the motor;
a correction-value calculation unit configured to calculate a correction value for correcting the basic drive value based on the motor current detected by the motor-current detection unit and the motor-rotational-angle change amount calculated by the rotational-angle-change-amount calculation unit, the correction value corresponding to a rotational angle of the motor at a time when the predetermined time has elapsed after the detection of the motor current;
a correction unit configured to correct the basic drive value calculated by the basic-drive-value calculation unit by the correction value calculated by the correction-value calculation unit so as to obtain the motor drive value; and
a drive unit configured to drive the motor by using the motor drive value obtained by the correction unit.

2. The motor control device according to claim 1, wherein the motor-current detection unit includes:
a phase-current detection unit configured to detect a phase current flowing through an armature winding of the motor; and
a coordinate conversion unit configured to convert the phase current detected by the phase-current detection unit into a current value of a rotational coordinate system, based on a rotor rotational position.

3. The motor control device according to claim 1, wherein the correction-value calculation unit calculates the correction value for non-interacting control of the motor.

4. The motor control device according to claim 3, wherein the basic-drive-value calculation unit is configured to calculate a d-axis drive voltage and a q-axis drive voltage;
the correction-value calculation unit is configured to calculate a d-axis correction value $D_d$ for correcting the d-axis drive voltage according to the formula:

$$D_d = -\omega L_q(-I_d \sin\theta + I_q \cos\theta);$$

the correction-value calculation unit is configured to calculate a q-axis correction value $D_q$ for correcting the q-axis drive voltage according to the formula:

$$D_q = \omega L_d(I_d \cos\theta + I_q \sin\theta) + \omega\Phi;\text{ and}$$

$\omega$ denotes a rotational angular speed of a motor, $L_d$ denotes a d-axis inductance, $L_q$ denotes a q-axis inductance, $I_d$ denotes a d-axis current, $I_q$ denotes a q-axis current, $\theta$ denotes a motor-rotational-angle change amount, and $\Phi$ denotes a factor of $(3/2)^{1/2}$ of a maximum value of a magnetic flux linkage of an armature winding in a field system of a motor.

5. The motor control device according to claim 3, wherein the basic-drive-value calculation unit is configured to calculate a d-axis drive voltage and a q-axis drive voltage;
the correction-value calculation unit is configured to calculate a d-axis correction value $D_d$ for correcting the d-axis drive voltage according to the formula:

$$D_d = -\omega L_q \cdot I_q \cos\theta;$$

the correction-value calculation unit is configured to calculate a q-axis correction value $D_q$ for correcting the q-axis drive voltage according to the formula:

$$D_q = \omega L_d \cdot I_d \cos\theta + \omega\Phi;\text{ and}$$

$\omega$ denotes a rotational angular speed of a motor, $L_d$ denotes a d-axis inductance, $L_q$ denotes a q-axis inductance, $I_d$ denotes a d-axis current, $I_q$ denotes a q-axis current, $\theta$ denotes a motor-rotational-angle change amount, and $\Phi$

12 denotes a factor of $(3/2)^{1/2}$ of a maximum value of a magnetic flux linkage of an armature winding in a field system of a motor.

6. The motor control device according to claim 1, wherein the motor control device updates the motor drive value for each predetermined calculation cycle so as to output the updated value,
the motor-current detection unit detects a motor current at a predetermined timing during the calculation cycle, and
the predetermined time is equal to or more than a time from a detection timing at which the motor current is detected by the motor-current detection unit during a certain calculation cycle until the motor drive value is updated during the calculation cycle, the predetermined time being defined as a length equal to or less than a time from the detection timing during the calculation cycle until the motor drive value is updated during a subsequent calculation cycle.

7. The motor control device according to claim 6, wherein the predetermined time is defined as equal to the calculation cycle.

8. A motor control device, comprising:
a motor-current detection unit configured to detect a motor current flowing through a motor;
a rotational-angular-speed calculation unit configured to calculate a rotational angular speed of the motor;
a rotational-angle-change-amount calculation unit configured to multiply the rotational angular speed calculated by the rotational-angular-speed calculation unit by a predetermined time so as to calculate the motor-rotational-angle change amount within the predetermined time;
a basic-drive-value calculation unit configured to calculate a basic drive value for driving the motor;
a correction-value calculation unit configured to calculate a correction value for correcting the basic drive value based on the motor current detected by the motor-current detection unit and the motor-rotational-angle change amount calculated by the rotational-angle-change-amount calculation unit;
a correction unit configured to correct the basic drive value calculated by the basic-drive-value calculation unit by the correction value calculated by the correction-value calculation unit so as to obtain the motor drive value; and
a drive unit configured to drive the motor by using the motor drive value obtained by the correction unit;
wherein the correction-value calculation unit calculates the correction value for non-interacting control of the motor;
the basic-drive-value calculation unit is configured to calculate a d-axis drive voltage and a q-axis drive voltage;
the correction-value calculation unit is configured to calculate a d-axis correction value $D_d$ for correcting the d-axis drive voltage according to the formula:

$$D_d = -\omega L_q(-I_d \sin\theta + I_q \cos\theta);$$

the correction-value calculation unit is configured to calculate a q-axis correction value $D_q$ for correcting the q-axis drive voltage according to the formula:

$$D_q = \omega L_d(I_d \cos\theta + I_q \sin\theta) + \omega\Phi;\text{ and}$$

$\omega$ denotes a rotational angular speed of a motor, $L_d$ denotes a d-axis inductance, $L_q$ denotes a q-axis inductance, $I_d$ denotes a d-axis current, $I_q$ denotes a q-axis current, $\theta$ denotes a motor-rotational-angle change amount, and $\Phi$ denotes a factor of $(3/2)^{1/2}$ of a maximum value of a magnetic flux linkage of an armature winding in a field system of a motor.

9. A motor control device, comprising:

a motor-current detection unit configured to detect a motor current flowing through a motor;

a rotational-angular-speed calculation unit configured to calculate a rotational angular speed of the motor;

a rotational-angle-change-amount calculation unit configured to multiply the rotational angular speed calculated by the rotational-angular-speed calculation unit by a predetermined time so as to calculate the motor-rotational-angle change amount within the predetermined time;

a basic-drive-value calculation unit configured to calculate a basic drive value for driving the motor;

a correction-value calculation unit configured to calculate a correction value for correcting the basic drive value based on the motor current detected by the motor-current detection unit and the motor-rotational-angle change amount calculated by the rotational-angle-change-amount calculation unit;

a correction unit configured to correct the basic drive value calculated by the basic-drive-value calculation unit by the correction value calculated by the correction-value calculation unit so as to obtain the motor drive value; and a drive unit configured to drive the motor by using the motor drive value obtained by the correction unit;

wherein the correction-value calculation unit calculates the correction value for non-interacting control of the motor;

the basic-drive-value calculation unit is configured to calculate a d-axis drive voltage and a q-axis drive voltage;

the correction-value calculation unit is configured to calculate a d-axis correction value $D_d$ for correcting the d-axis drive voltage according to the formula:

$$D_d = -\omega L_q \cdot I_q \cos\theta;$$

the correction-value calculation unit is configured to calculate a q-axis correction value $D_q$ for correcting the q-axis drive voltage according to the formula:

$$D_q = \omega L_d \cdot I_d \cos\theta + \omega\Phi;\ \text{and}$$

$\omega$ denotes a rotational angular speed of a motor, $L_d$ denotes a d-axis inductance, $L_q$ denotes a q-axis inductance, $I_d$ denotes a d-axis current, $I_q$ denotes a q-axis current, $\theta$ denotes a motor-rotational-angle change amount, and $\Phi$ denotes a factor of $(3/2)^{1/2}$ of a maximum value of a magnetic flux linkage of an armature winding in a field system of a motor.

10. A motor control device, comprising:

a motor-current detection unit configured to detect a motor current flowing through a motor;

a rotational-angular-speed calculation unit configured to calculate a rotational angular speed of the motor;

a rotational-angle-change-amount calculation unit configured to multiply the rotational angular speed calculated by the rotational-angular-speed calculation unit by a predetermined time so as to calculate the motor-rotational-angle change amount within the predetermined time;

a basic-drive-value calculation unit configured to calculate a basic drive value for driving the motor;

a correction-value calculation unit configured to calculate a correction value for correcting the basic drive value based on the motor current detected by the motor-current detection unit and the motor-rotational-angle change amount calculated by the rotational-angle-change-amount calculation unit;

a correction unit configured to correct the basic drive value calculated by the basic-drive-value calculation unit by the correction value calculated by the correction-value calculation unit so as to obtain the motor drive value; and a drive unit configured to drive the motor by using the motor drive value obtained by the correction unit;

wherein the motor control device updates the motor drive value for each predetermined calculation cycle so as to output the updated value;

the motor-current detection unit detects a motor current at a predetermined timing during the calculation cycle; and the predetermined time is equal to or more than a time from a detection timing at which the motor current is detected by the motor-current detection unit during a certain calculation cycle until the motor drive value is updated during the calculation cycle, the predetermined time being defined as a length equal to or less than a time from the detection timing during the calculation cycle until the motor drive value is updated during a subsequent calculation cycle.

11. The motor control device according to claim 10, wherein the predetermined time is defined as equal to the calculation cycle.

* * * * *